United States Patent [19]
Eriksson

[11] 3,814,232
[45] June 4, 1974

[54] CONTAINER HANDLING MACHINE

[76] Inventor: Karl Erik Ingemar Eriksson, Box 6001, S-700 06, Orebro, Sweden

[22] Filed: Dec. 15, 1972

[21] Appl. No.: 315,774

[30] Foreign Application Priority Data
Dec. 15, 1971 Sweden............................ 16042/71

[52] U.S. Cl................. 198/19, 198/33 AB, 198/34, 214/1 BB
[51] Int. Cl............................................. B23q 5/14
[58] Field of Search................... 198/33 AB, 34, 19; 214/1 BB

[56] References Cited
UNITED STATES PATENTS

| | | | |
|---|---|---|---|
| 2,602,561 | 7/1952 | Carter | 198/33 AB |
| 3,142,371 | 7/1964 | Rice et al. | 198/33 AB |
| 3,356,203 | 12/1967 | Noble et al. | 198/33 AB |
| 3,358,808 | 12/1967 | Reynolds | 198/33 AB |
| 3,587,815 | 6/1971 | Sorbie | 198/19 |
| 3,592,319 | 7/1971 | Rousseau | 198/19 |
| 3,690,456 | 9/1972 | Powers, Jr. | 198/33 AB |
| 3,710,937 | 1/1973 | Cook | 198/25 |

*Primary Examiner*—Evon C. Blunk
*Assistant Examiner*—Richard K. Thomson
*Attorney, Agent, or Firm*—Sughrue, Rothwell, Mion, Zinn & Macpeak

[57] ABSTRACT

This invention relates to a machine for feeding a series of containers, such as glass bottles, in a step-by-step manner between a number of stations along a straight path. The machine comprises a carrier consisting of a number of carrier fingers projecting outwardly from a common longitudinal bar perpendicular thereto. The bar extends parallel to said path and is arranged to carry out a continuous parallel movement around a circular loop. The machine further comprises two conveying screws arranged at respective ends of said path, one screw being arranged to feed the containers one by one to the input position of the carrier and the other screw being arranged to carry away the containers arriving at the output position of the carrier, both conveying screws being driven in timed relation to the carrier.

8 Claims, 2 Drawing Figures

CONTAINER HANDLING MACHINE

This invention relates to a machine for feeding a series of containers in a step-by-step manner between a number of stations along a straight path, for instance for inspection or marking of the devices at the stations.

In the packing industry, for example, there is a great need of machines for feeding containers between different stations along a predetermined path at a high rate and with high accuracy. Further, in case of glass bottles bumps between adjacent containers and between the containers, and the feeding means must be avoided.

In connection with the manufacture of glass containers these are inspected in different respects. Glass bottles, for example, are checked in respect of glass thickness, crack formations, irregularities, and deviations from the circular form. Preferably, these inspections are performed automatically at separate stations along a feeding path. To be able to inspect the bottles at the same rate at which they are manufactured the inspections have to be carried out very rapidly and the time for the advancement of the containers between the different stations has to be minimized. It is desired to obtain a rate of inspection such that at least 200–300 bottles per minute can be inspected. This makes great demands upon the feeding mechanism which has to be able to accelerate and retard the bottles at a high rate without damaging them.

To obtain the desired feeding rate and to permit the containers to be inspected over the entire height, the machine according to the invention comprises a carrier consisting of a number of carrier fingers projecting outwardly from a common longitudinal bar substantially perpendicular thereto, the bar extending substantially parallel to said path and being arranged to carry out a continuous parallel movement around a preferably circular closed loop.

When using this type of feeding mechanism to advance the containers between the stations, it is very important that the containers can be fed to the input station of the carrier one by one, at a high rate and equally spaced, and that the containers fed to the output station of the carrier are removed rapidly. This means that the containers will be subjected to a high acceleration when removed, which involves high requirements on the means used for the removal.

The machine according to the invention is characterized in that the machine further comprises two conveying screws arranged at respective ends of said path, one screw being arranged to feed the containers one by one to the input position of the carrier and the other screw being arranged to carry away the containers arriving at the output position of the carrier, both conveying screws being driven in timed relation to the carrier.

The invention will now be described in greater detail reference being made to the accompanying drawings.

Figure 1:
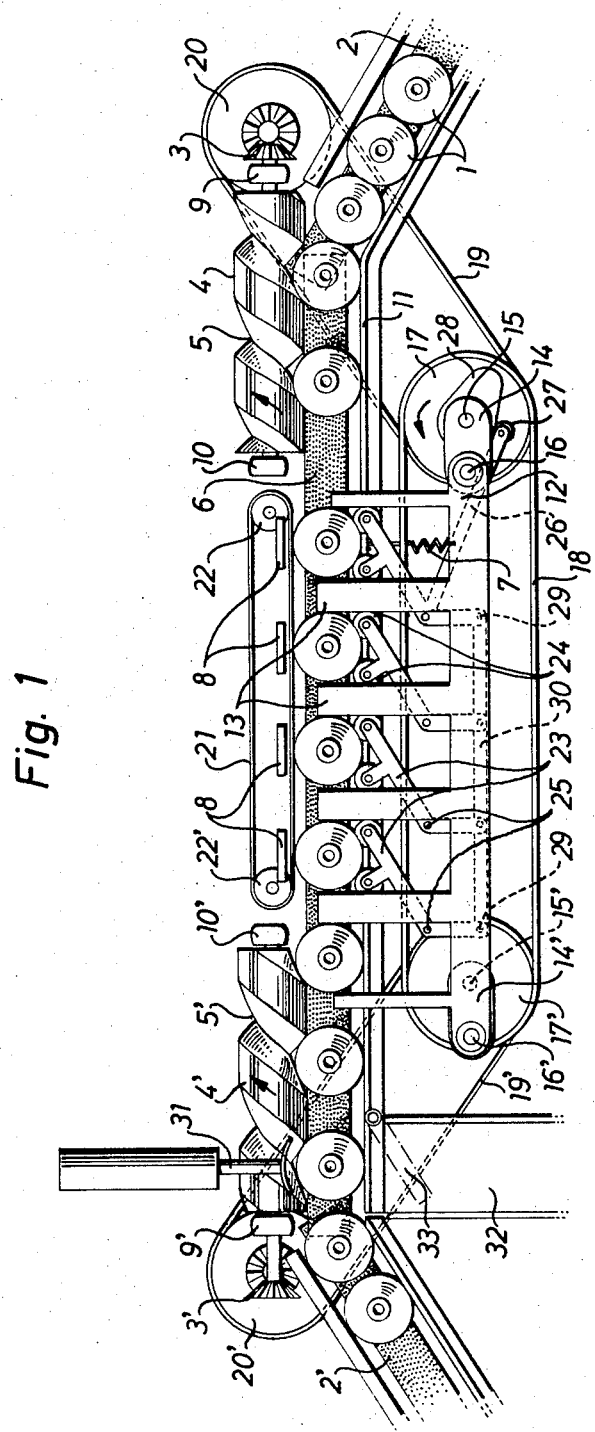
FIG. 1 is a top plan view of a machine according to one embodiment of the invention for inspection of glass bottles.
Figure 2:
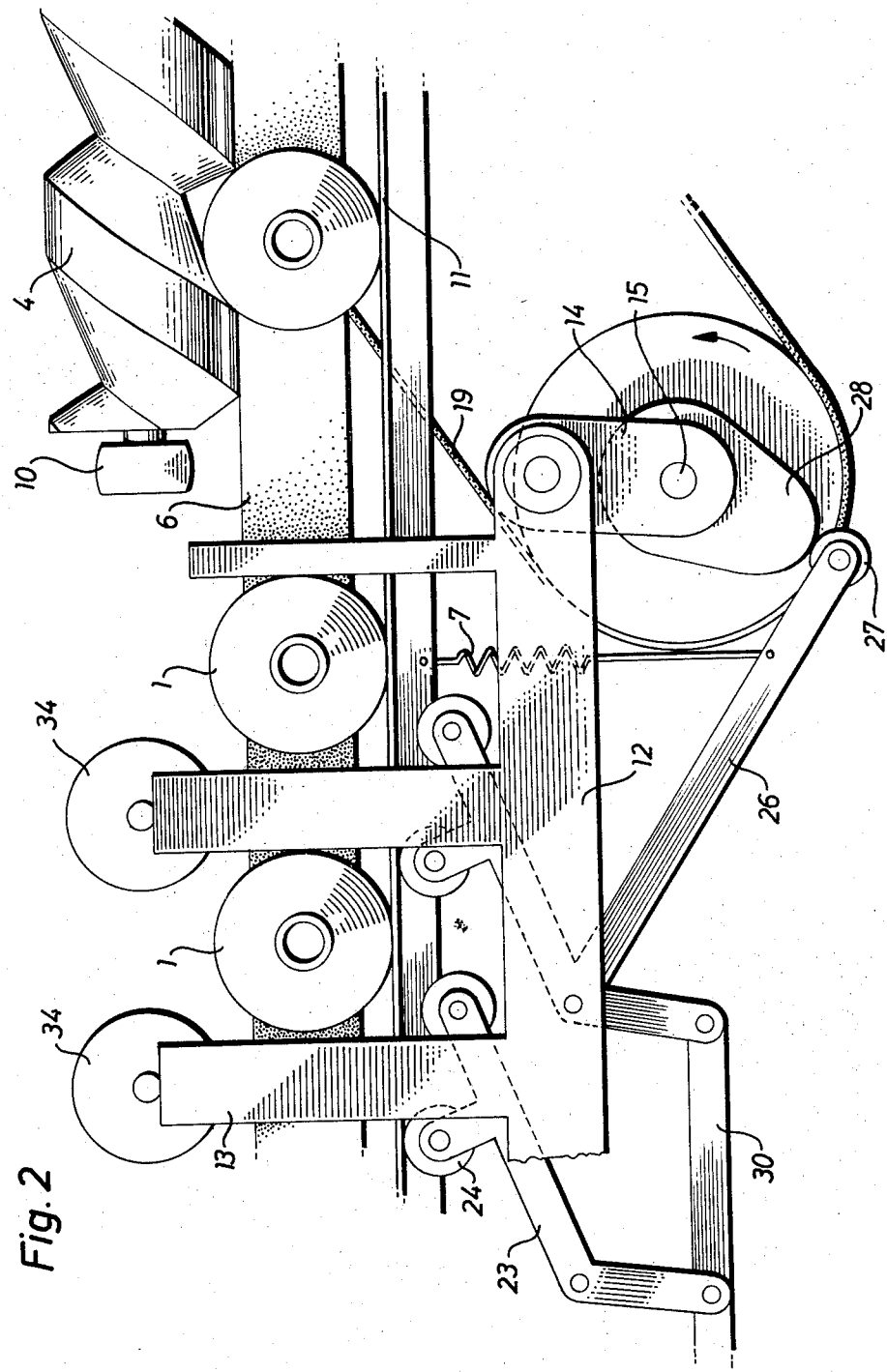
FIG. 2 is an enlarged view of a portion of the machine according to FIG. 1 showing the feeding mechanism in an earlier stage and provided with another type of means for rotating the bottles at the inspection stations.

The machine according to FIG. 1 and FIG. 2 comprises a feeding mechanism for synchronous feeding of bottles between a number of inspection stations - in FIG. 1 four stations - for inspection of the glass thickness, circularity, crack formations, irregularities and the like of the bottles. The bottles are rotated at least 360° at each inspection station and defective bottles are ejected at the end of the feeding path. The machine may have a capacity for inspection of about 250 bottles per minute.

In FIG. 1 reference numeral 1 designates the bottles which are fed to the machine by means of an input conveying belt 2. At the end of the belt 2 the bottles are caught and advanced by means of a conveying screw 4 provided with a wide, spiral groove 5 and driven through a gear wheel 3. The screw is rotated in the direction of the arrow. By means of the screw 4, the bottles 1 are fed one by one and equally spaced along a path 6 having a low friction coefficient to a predetermined station. Along its one edge the sliding path 6 is provided with a guide 11 for the bottles. A feeding screw 4' corresponding to the screw 4 and driven by a gear wheel 3' is arranged to receive the bottles when they have passed the inspection stations 8 disposed between the screws 4 and 4' and advance them to an output conveying belt 2'. The reference numerals 9, 9' and 10, 10' relate to suitable bearings for the conveying screws. If desired, the inner ends of the screws may, however, be directly interconnected. The pitch of the helical groove on the conveying screws may vary along the length of the screws and for example be low at the input end of the screws and increase towards their output end.

For feeding the bottles in a step-by-step manner between the inspection stations 8 the machine comprises a carrier which consists of a longitudinal bar 12 extending parallel to the path 6 and provided with a number of carrier fingers 13 projecting outwardly therefrom at right angles. The longitudinal bar 12 is mounted on two pivot pins 16 and 16' provided at the outer ends of two crank arms 14 and 14', respectively, the other ends of which are secured to respective rotatable shafts 15 and 15'. Shaft 15 is continuously driven by means of an electric motor, not shown. Further, the shafts 15 and 15' are provided with two pulleys 17 and 17', respectively which by means of a cone belt 18 transmit the rotation of shaft 15 to shaft 15', so that said shafts will rotate synchronously. The pulleys 17 and 17' are also by means of respective cone belts 19 and 19' connected to pulleys 20 and 20', respectively which drive respective gear wheels 3 and 3'. In the stage shown in FIG. 1 the carrier fingers 13 have just advanced a set of bottles 1 one step forward between the inspection stations 8. These stations may comprise optional plug-in units for optical and mechanical inspection of the bottles.

During said inspection the bottles 1 are rotated at least one complete turn at each station. According to FIG. 1 this is obtained by means of a flat belt 21 having a high friction coefficient and which is mounted on two rollers 22 and 22'. To force the bottles 1 against the belt 21 the machine comprises one pressing arm 23 for each station which arm is provided with two rollers 24 which are free to rotate around respective shafts. Each arm 23 has a knee at which it is mounted on an upright pivot pin 25. The right pressing arm is provided with an operating rod 26 having a cam roller 27 in engagement with a cam profile 28 on the pulley 17. The rod is biased against the profile by a spring 7. The pressing arms 23 are also by means of pivot pins 29 rotatably connected to a parallel bar 30. Thus, the arms will be swung synchronously around respective pins 25 when the shaft 15 with the cam profile 28 is rotated. As is realized from the FIG. 1, the mechanism used for this purpose is of very simple structure. In order to eject defective bottles the machine is provided with a piston 31 at its output end which upon activation ejects the defective bottles into a discharge passage 32 through a normally closed spring biased gate 33.

FIG. 2 is a view similar to that of FIG. 1 of the right portion of the machine. In FIG. 2 the machine is shown in an earlier stage of its feeding cycle than in FIG. 1. In the stage shown, the bottles 1 are located between two inspection stations 8 and the cam roller 27 cooperates with the highest point of the cam profile 28 which means that the rollers 24 have reached their outermost position. Further, the machine according to FIG. 2 differs from the machine according to FIG. 1 in that the means for rotation of the bottles at the inspection stations consist of a separate rotating roller 34 for each station. Preferably, these rollers are so arranged that they may be adjusted to fit bottles of different height. If desired, a plurality of parallel rollers 34 may be used, which cooperate with the bottles at different points.

The function of the machine shown in the drawings will now be described. As mentioned above, the conveying belt 2 feeds a series of bottles 1 to the conveying screw 4. By means of the helical groove 5 on said screw and the guide 11 the bottles are fed along the sliding path 6 one by one and equally spaced to a predetermined position on the path. The rotation of the conveying screw is synchronous with the rotation of the crank arms 14 and 14', and the angular positions of the crank arms relatively to the shafts 15 and 15' are so adjusted that a bottle reaches the inner end of the feeding screw 4, i.e., said predetermined position, at the same time as the crank arms have been rotated 180° from the positions shown in FIG. 1. This means that the carrier has been moved to its right end position and that the carrier fingers 13 will enter the spaces between the bottles when the carrier is moved further towards path 6. The right carrier finger 13 according to said Figure will project into the feeding path behind the bottle now fed to the above mentioned predetermined position by the conveying screw 4. During the following 90° of rotation of the crank arms 14 and 14' in the direction of the arrow, the carrier fingers 13 will be moved to the left while successively projecting into said spaces between the bottles thereby accelerating the bottles. After said rotation the fingers will be in their inner position according to FIG. 2. During the following 90° of rotation the bottles will be retarded and the carrier fingers successively withdrawn from the feeding path whereafter the next cycle starts. Thus, the carrier fingers will during their motion to the left during 180° of rotation of the shafts 15 and 15' be engaged with the advance the bottles one step during all of which time they will have a component of velocity parallel to the path in the direction from the right to the left in the figures, while during their return stroke during the next following 180° of rotation they will be out of engagement with the bottles.

When the crank arms 14 and 14' reach the positions shown in FIG. 1, the cam roller 27 has passed the highest point of the cam profile 28 and cooperates with the lowest portion thereof which results in the rollers 24 on pressing arms 23 force the bottles 1 against belt 21 in order to rotate the bottles. Thus, during the rotation the bottles are firmly held in a three points grip. The bottles are released when the pressing arms are swung around the pins 25 when the radial extension of the cam profile increases upon rotation of the shaft 15 about 180°. As a result of the relative angular positions between the cam profile 28 and the crank arm 14 the bottles are released at the same time as the carrier fingers start to project into the spaces between the bottles.

When an inspection station of the machine detects a defective bottle an indication signal is generated and fed to an electronic counter which determines when the piston 31 should be activated to eject the defective bottle into the passage 32. This simple way of effecting ejection of defective bottles by means of a piston controlled by an electronic counter is rendered possible due to the proper step-by-step advancement of the bottles between the stations and the conveying of the bottles equally spaced by the screw 4'. Further, by means of a conveying screw it is possible to remove the bottles fed to the output position of the carrier rapidly without damaging them, which is very important as otherwise these bottles should be broken by the outermost carrier finger 13 during the following feeding stroke. The groove 5' on the screw 4' and the guide 11 cooperate to prevent the bottles from tipping over due to the high acceleration the bottles are subjected to when removed. When the bottles have passed the position of the ejection piston 31, they may be delivered to a conventional conveying belt 2'.

The input and output conveying belts could be eliminated by arranging the conveying screws such that they form a small angle with the sliding path.

The apparatus above described permits very rapid, exact and synchronous advancement of bottles without any risk that they should be damaged due to mechanical forces. Above all this is obtained through the combination of a carrier which describes a continuous parallel movement along a preferably circular, closed loop, and conveying screws for feeding bottles to and away from the carrier. Due to the smooth acceleration and retardation of the bottles, the machine may be driven at very high speed far higher than is possible with known machines. The structure of the machine is very simple and reliable. Further, the machine according to the invention makes it possible to arrange the various inspection stations very close together. For example, the machine may comprise four stations per meter of its length which should be compared with a known machine which requires a length of four meters per station.

The embodiment shown on the drawings may be varied in several aspects. Thus, the number of carrier fingers and inspection stations may be chosen according to the requirements and, further, a number of machines according to FIG. 1 may be connected in series via conveying screws so that for example the first machine comprises only one station for inspection of the circularity of the bottles whereafter bottles which do not comply with the requirements could be ejected before the bottles are fed to the remaining inspection stations in a following machine. Further, the orientation of the carrier fingers in relation to the sliding path may be varied and the fingers may be arranged in a vertical plane perpendicular to the belt. Further, in some applications it may be necessary to replace the cone belts with chains or the like.

What I claim is:

1. A machine for feeding a series of containers in a step-by-step manner between a number of stations along a substantially straight path, said machine comprising:
   1. means for supporting said containers while they are being fed through said machine;
   2. a step-by-step carrier comprising a number of carrier fingers projecting outwardly from a common longitudinal bar substantially perpendicularly thereto;
   3. means for moving said step-by-step carrier in a closed loop such that said bar is substantially parallel to said path and has a component of velocity parallel to said path in one direction at all times when said carrier fingers engage said containers;
   4. a first conveying screw mounted in said machine at the input end of said path, said first conveying screw being located so that containers are passed directly from said first conveying screw to said step-by-step carrier;
   5. means for driving said first conveying screw in timed relation to said carrier;
   6. a second conveying screw mounted in said machine at the output end of said path, said second conveying screw being located so that containers are passed directly from said step-by-step carrier to said second conveying screw, and
   7. means for driving said second conveying screw in timed relation to said carrier.

2. A machine as claimed in claim 1 and further comprising:
   1. means for rotating the containers located at at least some of said stations on one side of said path;
   2. means for pressing the containers against said means for rotating the containers, said means for pressing the containers being dsposed at the side of said path opposite to said means for rotating the containers; and
   3. means for moving said means for pressing the containers in timed relation to said carrier so that said means for pressing the containers is in contact with the containers only when said carrier fingers are not in contact therewith.

3. Machine according to claim 2, wherein a guide for the containers is arranged along the path opposite to the conveying screws.

4. Machine according to claim 2, wherein an ejector is arranged to eject defective containers when they are in engagement with said second conveying screw.

5. A machine as claimed in claim 2 wherein said means for pressing the containers comprises a plurality of pressing arms.

6. Machine according to claim 5, wherein each pressing arm has a knee at which it is mounted on a pivot pin.

7. Machine according to claim 5, wherein the pressing arms have two fingers each provided with a rotatable wheel for engagement with the containers.

8. Machine according to claim 5, wherein the pressing arms are controlled by a cam profile and the carrier is driven via a crank arm, the cam profile and the crank arm being fixed at the shaft from which said first screw is driven.

* * * * *